United States Patent
Szymkowiak (10) Patent No.: US 6,454,031 B2
(45) Date of Patent: Sep. 24, 2002

(54) VEHICLE TRANSMISSION APPARATUS

(75) Inventor: Zbigniew Szymkowiak, Waterloo (CA)

(73) Assignee: Ontario Drive & Gear Limited, New Hamburg (CA)

( * ) Notice: Subject to any disclaimer, the term of this patent is extended or adjusted under 35 U.S.C. 154(b) by 0 days.

(21) Appl. No.: 09/767,869

(22) Filed: Jan. 24, 2001

(30) Foreign Application Priority Data

Jan. 25, 2000 (GB) .............................................. 0001605
Nov. 29, 2000 (GB) .............................................. 0029118

(51) Int. Cl.$^7$ ............................................ B62D 11/00
(52) U.S. Cl. ......................... 180/6.2; 475/207; 475/18
(58) Field of Search ............................... 180/6.2, 6.24, 180/6.44; 475/18, 28, 248, 207

(56) References Cited

U.S. PATENT DOCUMENTS

| | | | |
|---|---|---|---|
| 1,542,069 A | 6/1925 | MacKay-White | 475/28 |
| 1,991,094 A | 2/1935 | Higley | 180/17 |
| 1,999,071 A | 4/1935 | Alden | 180/22 |
| 2,253,757 A | 8/1941 | Bugatti | 115/35 |
| 2,332,838 A | 10/1943 | Borgward | 180/9.2 |
| 2,336,912 A | 12/1943 | Zimmermann | 180/9.2 |
| 2,542,157 A | 2/1951 | Odom | 74/664 |
| 2,730,182 A | 1/1956 | Sloane | 190/6.44 |
| 2,763,164 A | 9/1956 | Neklutin | 74/687 |
| 2,780,299 A | 2/1957 | Matson | 180/6.28 |
| 2,859,641 A | 11/1958 | Gleasman | 74/715 |
| 3,027,780 A | 4/1962 | Storer, Jr. et al. | 74/710 |
| 3,371,734 A | 3/1968 | Zaunberger et al. | 180/6.44 |
| 3,450,218 A | 6/1969 | Looker | 180/6.44 |
| 3,670,594 A * | 6/1972 | Roper | 74/689 |
| 4,016,754 A | 4/1977 | Wiss | 73/117.3 |
| 4,274,281 A | 6/1981 | Hoodwin | 73/118 |
| 4,280,579 A * | 7/1981 | Zaunberger et al. | 180/6.44 |
| 4,331,208 A | 5/1982 | Kolthoff et al. | 180/6.2 |
| 4,434,680 A | 3/1984 | Riediger et al. | 74/682 |
| 4,489,597 A | 12/1984 | Davidson, Jr. | 73/118 |
| 4,497,218 A | 2/1985 | Zaunberger | 74/682 |
| 4,724,721 A | 2/1988 | Gleasman et al. | 74/715 |
| 4,776,235 A | 10/1988 | Gleasman et al. | 74/720.5 |
| 4,776,236 A | 10/1988 | Gleasman et al. | 475/6 |
| 4,890,508 A | 1/1990 | Zaunberger | 74/687 |
| 4,895,052 A | 1/1990 | Gleasman et al. | 475/7 |
| 4,917,200 A * | 4/1990 | Lucius | 180/6.2 |
| 4,976,669 A | 12/1990 | Jones | 475/248 |
| 5,088,969 A | 2/1992 | Arndt | 475/201 |
| 5,471,892 A * | 12/1995 | Sherman | 74/325 |
| 5,662,543 A * | 9/1997 | Forsyth | 475/198 |
| 5,951,424 A * | 9/1999 | Briceland | 475/72 |
| 6,151,990 A * | 11/2000 | Johnson et al. | 74/606 |

FOREIGN PATENT DOCUMENTS

| | | | |
|---|---|---|---|
| FR | 1162937 | 9/1958 | |
| GB | 707655 | 4/1954 | |
| GB | 735666 | 8/1954 | |
| IT | 323334 | 8/1934 | |
| WO | WO98/44991 | 10/1998 | ........... A62C/27/00 |

OTHER PUBLICATIONS

Popular Science Michael Bargo Jr Jul. 1985, All–Gear Steering.

* cited by examiner

Primary Examiner—Avraham Lerner
Assistant Examiner—Daniel Yeagley
(74) Attorney, Agent, or Firm—Anthony Asquith & Co.

(57) ABSTRACT

The ATV transmission includes an epicyclic arrangement, which serves as a drive-differential. One road wheel is geared to the planet-carrier or spider, and the other to the ring gear, while the engine drives the sun. An idler-gear between the ring and its road wheel means that the ring and the spider rotate in opposite senses, whereby a large gear ratio between the sun and the road wheels can be provided. Steering of the vehicle is provided, by driving the road wheels at different speeds. This is accomplished using a steer-differential, which is identical to the drive-differential; rotating the sun of the steer-differential imposes a corresponding differential speed on the road wheels.

23 Claims, 6 Drawing Sheets

VEHICLE TRANSMISSION APPARATUS

BRIEF SUMMARY OF THE INVENTION

This invention relates to a transmission apparatus for a vehicle. The apparatus is primarily intended for an all-terrain vehicle, and for other vehicles in which the ratio between the engine speed and the size of the road wheels tends towards the high-engine-speed, low-wheel-speed end of the scale. The apparatus is intended for use on vehicles of the kind in which skid-steering has traditionally been employed, including tracked vehicles, and vehicles in which a line of wheels on the right side are all chained together and a line of wheels on the left side are all chained together.

BRIEF DESCRIPTION OF THE DRAWINGS

Exemplary embodiments of the invention will now be described with reference to the accompanying drawings, in which:

FIG. 4b is a diagrammatic plan-view of the apparatus of FIG. 4a.

DETAILED DESCRIPTION OF THE INVENTION

The apparatuses shown in the accompanying drawings and described below are examples which embody the invention. It should be noted that the scope of the invention is defined by the accompanying claims, and not necessarily by specific features of exemplary embodiments.

Figure 1:
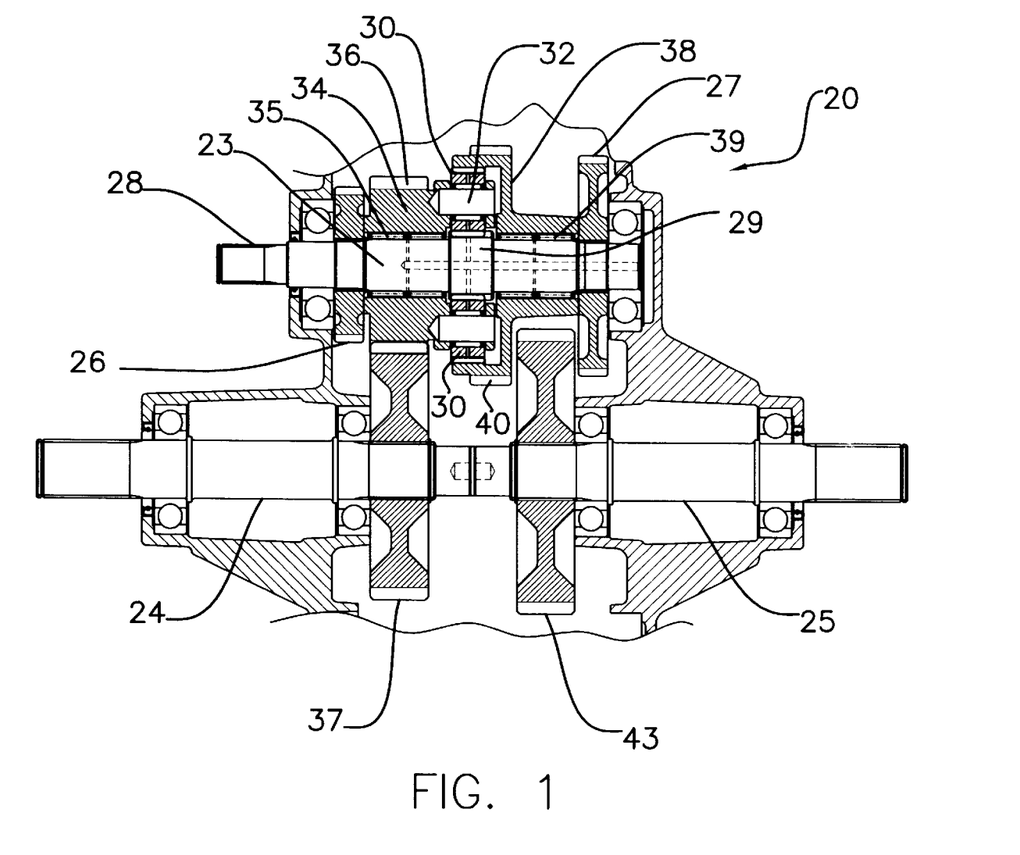
FIG. 1 is a cross-section of a transmission apparatus for a vehicle.

FIG. 1 is a diagram of a differential unit 20 for a vehicle. The power input to the differential is at input shaft 23, and the outputs to the road-wheels of the vehicle are at left and right output shafts 24,25. The unit 20 serves to allow the road-wheels to adopt the different speeds relative to each other that the wheels undergo when the vehicle is being steered around a curve. The differential unit 20 of FIG. 1 is a "free" differential; that is to say, if one road-wheel should lock, the other road-wheel is free to rotate at twice the speed.

The input shaft 23 takes drive from either 1st drive gear 26 or 2nd drive gear 27, depending which has been selected by a gear-selection mechanism (not shown in FIG. 1). (The extension 28 of the input shaft shown in FIG. 1 is for a brake.) The input shaft carries teeth, which serve to define a sun-gear 29. Meshing with the sun-gear 29 are a number of planet gears 30, carried on respective spindles 32, the spindles being mounted in a spider 34. The spider 34 is guided by needle-bearings 35 for rotation about the input shaft 23. The spider 34 carries spider-output-teeth 36, which mesh with the left-output-gear 37, which is unitary with the left-output-shaft 24.

The planet gears 30 also mesh internally with the internal gear-teeth of ring 38. The ring 38, like the spider 34, is guided by bearings 39 for rotation about the input shaft 23.

Figure 1A:
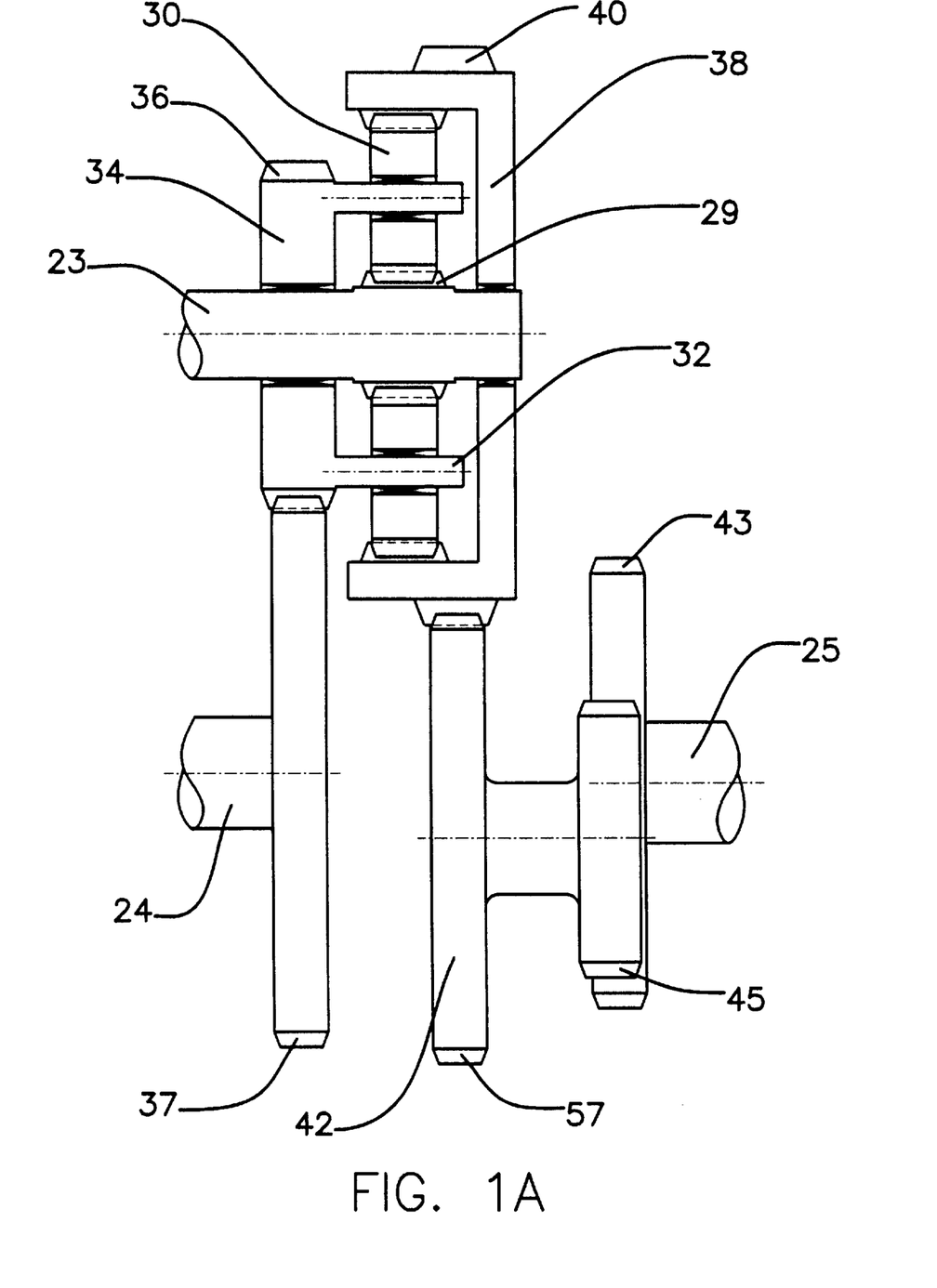
FIG. 1a is a diagrammatic cross-section of the apparatus of FIG. 1, showing the manner of interaction of some of the gears of the apparatus.

The ring 38 carries ring-output-teeth 40. The ring-output-teeth 40 mesh with a right-output-idler-gear, which is not shown in FIG. 1, but which is carried in the differential housing. FIG. 1a shows the disposition of the right-output-idler-gear 42, diagrammatically, as to its manner of location. The right-output-idler-gear 42 also meshes with the right-output-gear 43 on the right output shaft 25.

The spider 34 drives the left-output-shaft 24, and the ring 38 drives the right-output-shaft 25. The vehicle requirement is that the two output shafts must rotate in the same sense. Therefore, since the spider 34 and the ring 38 rotate in opposite senses, the drive to one of the output shafts 24,25 must go through an idler gear, whereby the rotation of that one output shaft is reversed. This condition is met in the apparatus of FIG. 1, in that the drive between the spider 34 and the left-drive-gear 37 is direct, as shown, whereas the drive between the ring 38 and the right-output-gear 43 goes through the right-output-idler-gear 42, and is thereby made to rotate in the same sense as the left-drive-gear 37.

As a result, since the ring and the spider rotate in opposite senses, the two output shafts rotate in the same sense. It should be understood that FIGS. 1 and 1a are diagrammatic: naturally, the designer must see to it that the various gears can lie in mesh with each other, and of course can be assembled. Also, in most vehicles, the left and right output shafts have to be co-axial. Thus, it may be required that both the left drive and the right drive must go through intermediate gears: in that case, to ensure that both output shafts turn in the same sense, whatever the number of intermediate gears going to the left-output-shaft, there must be one more, or one less, intermediate gears going to the right-output-shaft.

In a sun and planet gear arrangement, in addition to the fact that the spider and the ring rotate in opposite senses when the sun is driven, the ratio between the sun and the spider is not the same as the ratio between the sun and the ring. The ratios may be determined as follows:

the sun rotates at Vsun, the ring at Vring, the spider at Vspider;

the sun gear has Nsun teeth, and the ring gear has Nring teeth;

if the spider 34 is held stationary (Vspider=0), the ring 38 rotates at a speed of Vring=Vsun*Nsun/Nring (in the opposite rotational sense to the sun gear);

if the ring 38 is held stationary (Vring=0), the spider 34 rotates at a speed of Vspider=Vsun*Nsun/(Nring+Nsun) (in the same rotational sense as the sun gear).

Generally, what is required in a vehicle is that, when the left and right output shafts are rotating at the same speed, the output shafts are then being driven with nominally the same torque. In fact, during light driving, it would not really matter if the left wheel were being driven with more torque than the right wheel. But, if the vehicle is being driven in a heavy manner, it does matter, because the more vigorously driven wheel might tend to spin. If more torque is being fed to the left wheel than to the right wheel, the left wheel would be more likely to overcome its frictional grip on the ground, and spin. But if both wheels are being driven with the same torque, both have the same tendency to spin, whereby the overall tendency for the wheels to spin is minimised.

So, the designer should see to it that the overall gear ratio between the sun gear 29 and the left shaft 24, via the spider 34, is the same as the overall gear ratio between the sun gear 29 and the right shaft 25, via the ring 38. When that is so, the available torque is divided equally between the output shafts. That is to say, in order for the available torque from the sun gear to be divided equally between the two output shafts, when the two output shafts are rotating at the same speeds, the overall ratio between the sun and the left shaft, via the spider, must be the same as the overall ratio between the sun and the right shaft, via the ring.

Consider the case where the number of teeth in the ring gear, Nring, is three times the number of teeth in the sun gear, Nsun. Now, if the left shaft were driven at the same speed as the spider, i.e if the gear ratio between the spider and the left shaft is 1:1, the ratio between the ring and the right shaft would have to be 4:3 (i.e the right shaft rotates slower than the ring), in order for the left shaft and the right shaft to receive equal torques. Similarly, if, instead, the right shaft and the ring were geared 1:1, the spider and the left shaft would have to be geared 3:4 (i.e the left shaft rotates faster than the spider) in order for the left and right shafts to receive equal torques. Alternatively, if the left shaft and the spider were geared at say 3:2 (as is the case in FIG. 1), the right shaft and the ring have to be geared at 2:1, for the shafts to receive equal torques.

In FIG. 1, the sun gear 29 has twenty-three teeth and the ring 38 has sixty-nine internal teeth (for a 3:1 ratio between ring and sun). The spider 34 has thirty teeth at 36 and the left output gear 37 has forty-five teeth (for a 3:2 ratio between spider and left shaft). The ring 38 carries fifty-six external teeth at 40, which mesh with fifty-six teeth on the idler 42; the twenty-five teeth 45 on the idler 42 mesh with the fifty teeth on the right-output-gear 43 (for a 2:1 ratio between ring and right shaft).

Thus, in the differential transmission unit of FIG. 1, when the vehicle is moving straight ahead, and the road wheels are therefore rotating at equal speeds, the overall gear ratio between the sun 29 and the left shaft 24 is the same as the overall ratio between the sun 29 and the right shaft 25; plus, the idler gear 42 between the ring 38 and the right shaft 25 ensures that the shafts 24,25 rotate in the same sense. Therefore, the unit behaves, in one sense, like a traditional free differential: the two output shafts 24,25 divide the torque received from the input shaft 23 equally between them. If one output shaft should speed up, e.g by being the outside wheel as the vehicle turns a corner, the shafts are free to adopt the relative speeds imposed by the cornering manoeuvre, and the available torque is still fed to each wheel equally.

However, the unit 20 of FIG. 1 is unlike a traditional differential, in the sense that the unit itself contains an overall or aggregate gear ratio. In a normal differential, during straight ahead motion (i.e when the output shafts are rotating both at the same speed), the differential itself, as a unit, rotates as a complete unit in unison with the output shafts. That is to say, the gears inside the differential do not move relative to each other. In a normal differential, relative movements of the gears within the differential occurs only when the output shafts are rotating at different speeds, i.e when the vehicle is being steered. In the apparatus of FIG. 1, the gears within the apparatus are rotating relative to each other all the time, whether the vehicle is going straight ahead, or is being steered.

This overall ratio of the epicyclic or planetary differential unit 20 depicted in FIG. 1 may be assessed as follows.

The speed ratio between the sun 29 and the ring 38, with spider 34 fixed, is Nring/Nsun. In the particular FIG. 1 case, this ratio is 3:1. That is to say, for every one rev of the ring, the sun completes three revs; or, when the spider is fixed, the ring rotates at one-third the speed of the sun, and in the opposite direction.

The speed ratio between the sun 29 and the spider 34, with ring 38 fixed, is Nring/Nsun+1. Thus, for every one rev of the spider, the sun completes four revs. That is to say: when the ring is fixed, the spider rotates at one-quarter the speed of the sun, and in the same direction.

With the ring 38 fixed, four clockwise revs of the sun 29 turn the spider 34 one rev clockwise; with the spider 34 fixed, three clockwise revs of the sun 29 turn the ring 38 one rev anticlockwise. Thus, one complete clockwise rev of the spider, added to one complete anticlockwise rev of the ring, takes seven clockwise revs of the sun. If the sun 29 were to rotate at 4900 rpm clockwise, and if the ring 38 and the spider 34 were to be constrained to rotate both at the same speed (in opposite directions), that speed would be 700 rpm each—the spider at 700 rpm clockwise and the ring at 700 rpm anti-clockwise. However, preferably, the spider should be geared to rotate ¾ times the speed of the ring, and that is what has been done in the unit 20 of FIG. 1. Consequently, in FIG. 1, if the sun rotates at 4900 rpm clockwise, the spider rotates at 600 rpm clockwise, and the ring rotates at 800 rpm anti-clockwise. Given that the sun 29 is turning at 4900 rpm clockwise, it follows that when the vehicle is being driven forwards in a straight line, whereby the two road wheels (and the two output shafts which carry the road wheels) are turning at equal speeds, both anticlockwise, the spider rotates at 600 rpm clockwise and the ring rotates at 800 rpm anticlockwise.

As explained, the unit 20 includes an overall gear reduction. This is unlike a conventional differential, which does not provide a gear reduction, in itself. If, in the conventional unit, a reduction is required (as it usually is) between the input shaft and the output shafts, the reduction has to come from some arrangement outside the differential itself. Thus it is common for a conventional differential to be driven through e.g a crown wheel and pinion, which has a ratio in the region of e.g 3:1 or 4:1. The conventional differential does not itself provide any speed reduction, i.e it has a ratio of 1:1.

It is recognised that in some types of vehicle, it would be advantageous to provide a gear ratio actually in the differential, which, as explained, is the case with the differential unit 20 of FIG. 1. In ordinary vehicles, the running speed of the engine and the size of the tires traditionally are such that the 1:1 ratio in the differential is ideal. Indeed, the 1:1 ratio is so well-suited to traditional road vehicles that if the differential did have a ratio, a corresponding set of gears would have to be provided, to compensate, and to restore the overall ratio. As a result, the differential as depicted in FIG. 1 is not ideally suitable for a vehicle such as a traditional automobile.

However, some other types of vehicle have a different set of parameters as to the overall ratio between the engine and the road wheels. All-terrain vehicles, for example, generally have comparatively high-revving engines for the size of wheels. The need arises, in such a vehicle, for the transmission to have a considerably larger overall ratio than is common in an ordinary road vehicle. Traditionally, this has meant that in such vehicles a reduction gear has had to be provided. The differential as depicted in FIG. 1 avoids that need. It provides a unit that not only divides the torque between the two output shafts, but imposes an overall ratio, typically of 7:1 or thereabouts, between the input shaft and the two output shafts.

It may be noted that it would be very difficult to arrange for a crown-wheel and pinion, as traditionally associated with the differential on an automobile, to have a gear ratio as high as 7:1.

The apparatus as described in FIG. 1 may be used as it stands, simply as a "free" differential. However, the apparatus can also serve as an element in a steering control system for the vehicle. Now, instead of the two output shafts 24,25 of the differential being free as to their relative speeds, the two output shafts are driven to rotate, either at the same speed (for straight ahead), or at different speeds, when it is desired to steer the vehicle to the left or right. The magnitude of the imposed difference between the speeds of the left and right wheels serves to define the radius of the turning circle the vehicle undergoes.

(It is noted that the idea is known, of driving the left and right road wheels at different speeds, as a way of steering a vehicle. That is to say, it is known to apply engine power to the left and right wheels of the vehicle through a differential, and then to steer the vehicle by the use of a means for imposing a pre-determined velocity difference on the two wheels.)

Figure 2:
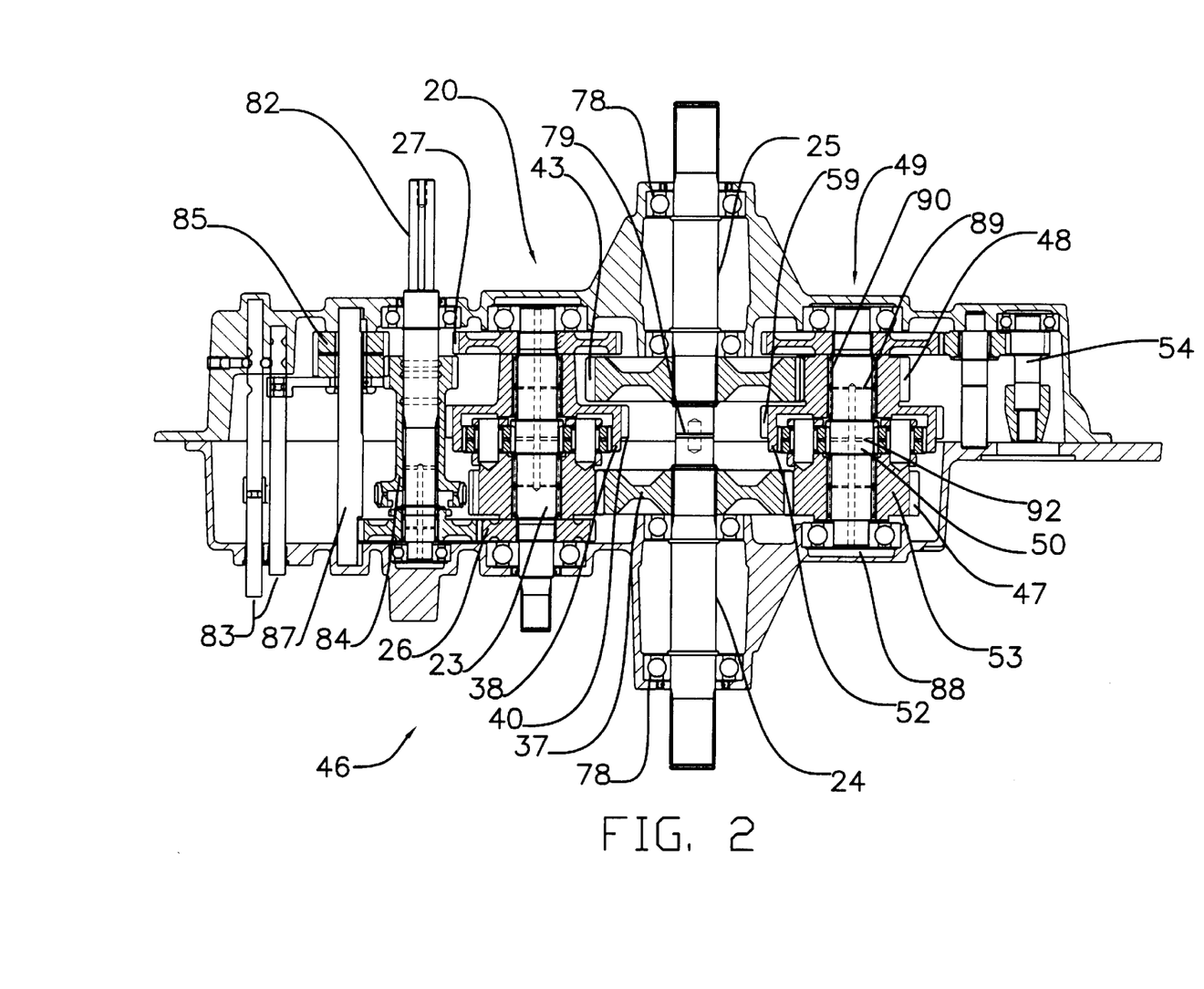
FIG. 2 is a cross-section of a transmission apparatus, which includes the apparatus of FIG. 1 as a component thereof.

FIG. 2 shows a combined transmission/steering apparatus 46. It may be noted that the portion of the apparatus indicated by numeral 20 is a differential, and in fact is the differential 20 depicted in FIG. 1. But now, the drive gears 37,43 on the left and right shafts 24,25 are in mesh with gears 47,48 respectively, whereby the output shafts 24,25 are not simply free to adopt their own speeds, relative to each other. Rather, any constraints on the gears 47,48 will now act as constraints on the relative speeds of the two output shafts. As will be explained, the gears 47,48 are constrained in such manner as to force the two output shafts 24,25 to rotate at the same speeds for straight ahead steering, or at different speeds for steering to left or right.

As shown in FIG. 2, the means for imposing the required speed difference between the left and right output shafts 24,25 takes the form of a second epicyclic or planetary unit 49, which is more or less identical to the parallel unit 20 which, as described, serves as the differential. In the unit 49, again, the sun 50 has twenty-three teeth and the ring 52 has sixty-nine internal teeth. The spider 53 carries thirty teeth, at 47, in mesh with the forty-five teeth of the left output gear 37. The ring 52 carries twenty-five (external) teeth, at 48, which mesh with the fifty teeth of the right output gear 43.

In FIG. 2, the speed of the sun gear 50 is determined by the speed of a steering shaft 54. If the steering shaft is stationary, then the sun gear 50 is also stationary. When that is so, the spider 53 carrying the planetary gears rotates at a fixed ratio relative to the ring 52, with its internal gear. For example, when the output shafts 24,25 are both rotating at the same speed of 400 rpm, the spider 53, being geared to the left shaft 24 at a ratio of 3:2, rotates at 600 rpm. The ring 52, being geared to the right output shaft 25 at a ratio of 2:1, rotates at 800 rpm.

As shown in FIG. 2, the right output shaft 25 is geared directly to the ring 52, and the left output shaft 24 is geared directly to the spider 53, and therefore, since the left and right shafts rotate in the same sense, the ring and the spider are also constrained to rotate both in the same sense. That is to say, when the output shafts 24,25 are both rotating at 400 rpm, the spider 53 is rotating at 600 rpm and the ring 52 is rotating at 800 rpm, both in the same sense.

The speed ratios of the epicyclic unit 49 can be assessed in the same manner as those of the differential unit 20. Thus, it may be noted that the condition required for the steer-sun 50 to be stationary, is that the steer-ring 52 and the steer-spider 53 rotate at a speed ratio of 4:3. Thus, with the ratios in the unit of FIG. 2, when the steering shaft 54 is not rotating, the output shafts 24,25 are constrained to rotate both at the same speed.

To repeat: if the output shafts 24,25 are rotating both at 400 rpm clockwise, the steer-spider 53 is rotating at 600 rpm anti-clockwise, the steer-ring 52 is rotating at 800 rpm anti-clockwise, and the steer-sun 50 (plus the steering shaft 54) is stationary. At the same time, in the differential unit 20, the drive-ring 38 is rotating at 800 rpm clockwise, the drive-spider 34 is rotating at 600 rpm anti-clockwise, and the drive-sun 29 is rotating at 4900 rpm anti-clockwise.

Again, it will be understood that in the planetary differential unit 20, the drive-spider 34 and the drive-ring 38 rotate in opposite senses at a 4:3 ratio, and the drive-sun 29 rotates at high speed; whereas in the planetary steering unit 49, the steer-spider 53 and the steer-ring 52 rotate both in the same sense at a 4:3 ratio, and the steer-sun 50 is stationary.

The ratio between the speed of the drive-sun-gear 29 and the speed of the output-shafts 24,25 is 4900:400, when both shafts are turning at the same speed. Similarly for steering purposes, it will be understood that, whatever speed is imposed on the steer-sun-gear 50 by the steering shaft 54, the ratio between that speed and the difference between the speeds of the output-shafts also is 4900:400. It may be noted that this speed difference between the output shafts has the same 4900:400 ratio to the speed of the steer-sun-gear, throughout the range of actual speeds of the output shafts.

It may be inferred, indeed, that if the vehicle is stationary when the steering shaft 54 is set in rotation, the tendency will be for the vehicle to simply go round in a circle. Whether the vehicle actually does so depends on the disposition of the other wheels on the vehicle. Vehicles for which the kind of drive as described herein might be considered are often tracked, or have several linked wheels arranged in a line along the sides of the vehicle. In those cases, it would be inadvisable to try to make the vehicle spin without moving forwards, because doing so would impose potentially damaging side loads on the tracks or wheels. However, the fact that the steering system makes such a manoeuvre even possible is an indication of the degree with which the steering of such vehicles can be controlled, by the steering system as described. The steering of tracked vehicles is notoriously highly inefficient and crude, whereas the system as described herein permits the steering to be delicately and closely controlled and coordinated with the forwards motion.

Attention is directed to the right-output-idler-gear 42 in FIG. 1a. This component has two sets of gear teeth, one set 57 having fifty-six teeth, and the other set 45 having twenty-five teeth. The fifty-six teeth at 57 mesh with the fifty-six teeth at 40 of the ring 38, and the twenty-five teeth at 45 mesh with the fifty teeth at 43 on the right output shaft 25. Thus, there is a 2:1 ratio between the ring 38 and the right output shaft 25.

It is recognised that the idler 42 need not be a separate component, but can be the same component as the ring 52 of the steering unit 49. As shown in FIG. 2, ring 52 carries fifty-six teeth, at 59; and ring 52 also carries twenty-five teeth, at 48. Thus, the idler 42 in FIG. 1a and the ring 52 in FIG. 2 can be, and in FIG. 2 are, one and the same component.

Figure 3:
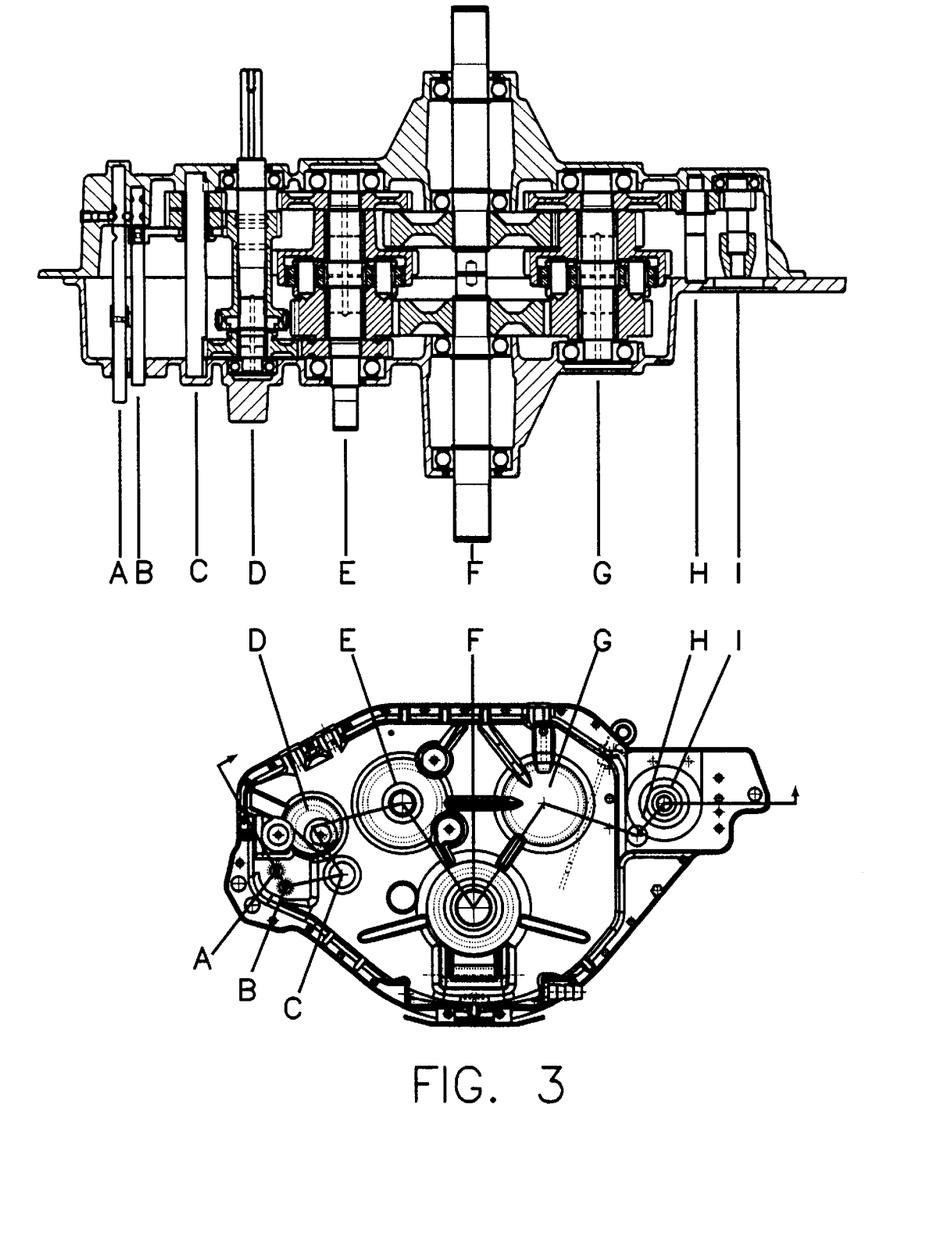
FIG. 3 comprises the view of FIG. 2 in conjunction with an end elevation of the apparatus.

That is to say, the fifty-six teeth 40 on the ring 38 of the differential unit 20 mesh directly with the fifty-six teeth 59 on the ring 52 of the steering unit 49. This condition is not apparent from FIG. 2. This is because, in FIG. 2, the various shafts are shown as if they were all in a line. FIG. 3 shows how the end-on arrangement of the shafts corresponds with the view of FIG. 2, from which it will be understood that the teeth 40 on the ring 38 do indeed mesh with the teeth 59 on the ring 52.

Thus, the rings 38 and 52 are constrained always to rotate at the same speeds, but in the opposite sense. It will be understood that this manner of linking the differential unit 20 and the steering unit 49 leads to a very economical and compact arrangement of gears. It may be noted especially that all the gear shafts are parallel, and the number of shafts is small in number, given the fact that the overall apparatus combines the complete transmission, differential, final drive, and steering functions of the vehicle. The apparatus is arranged so that the engine is coupled to the input shaft 23, and the road wheels are coupled to the output shafts 24,25, and that is all that need be done to secure the several functions just mentioned.

The drive to the input shaft 23 comes from the pre-input shaft 82. Selector rods 83 are used to move the sliding gear 84 to left or right along the pre-input shaft 82, and the reverse gear 85 along the shaft 87, whereby the sliding gear 84 meshes either with the 1st gear 26 or the second gear 27, for different drive ratios, and for reverse. The vehicle's engine (not shown) drives the pre-input shaft 82 via a clutch (not shown).

The vehicle is steered by setting the steering shaft 54 to rotate. As mentioned, a constant speed of rotation imposed on the steering shaft 54 gives rise to a corresponding constant difference between the speed of the left wheels and the speed of the right wheels. To restore the vehicle to straight ahead motion, the rotation of the steering shaft is cancelled, whereby the difference between the speed of the left wheels and the speed of the right wheels is cancelled.

The steering shaft 54 may be rotated by any appropriate means. For example, an electric motor might be provided, and the driver of the vehicle steers the vehicle by supplying power to the said motor, causing it to rotate, clockwise or anti-clockwise, at the speed appropriate to the desired steering effect, left or right.

Alternatively, the steering shaft 54 may be rotated by means of a hydraulic pump and motor. Suitable pump/motor units are readily available, in which the speed of the shaft is controlled by the swash-plate of the pump/motor unit. The swash-plate lever is simply operated from the vehicle's steering tiller or wheel.

When the speed of the steering shaft is controlled by a hydraulic pump/motor unit, it can be simply arranged that the hydraulic oil for the pump/motor unit is the same as the lubricating oil used in the transmission apparatus.

On the subject of lubrication of the gears and bearings in the apparatus, attention is directed to the various oil passageways as illustrated in FIG. 2. For example, oil collects in the compartment 88. From there, the oil flows along the centre of the shaft 23, and out of the radial ducts 89 to the needle bearings 90. Centrifugal force from the rotating shaft serves to ensure a vigorous circulation of oil. Ducts 92 also convey oil through the planet gears to the needle bearings by which the planet gears are mounted on their spindles. The remainder of the gears and bearings are lubricated by splash. It should be noted that the arrangement of the gears as herein depicted lends itself to this manner of supplying pressurised oil to the needle bearings, even the needle bearings in the planet gears, and there is no need for a lubrication pump, complex pipework, etc.

As mentioned, the steering shaft 54 is held stationary when the vehicle is being driven straight ahead. That arises because the ring 52 and the spider 53 are constrained to rotate at a speed ratio of 4:3. However, if some other ratio were imposed between the ring 52 and the spider 53, the steering shaft would then have to be rotated at some actual speed for straight ahead motion.

For example, the gearing between the ring and the spider might be arranged such that: a speed of 200 rpm on the steering shaft corresponds to straight ahead motion; a speed of 400 rpm on the steering shaft corresponds to a full-steering-lock to the left; and a speed of zero rpm at the steering shaft corresponds to full-steering-lock to the right. In that case, the driver-control would be a control for changing the speed of the steering shaft, and thus the driver-control need not include a provision for driving the steering shaft into selectably either forwards or reverse rotation.

In some cases, it can be easier to engineer a system in which the steering shaft is always rotating, and always in the same direction, than a system in which the steering shaft has to be made to rotate in either sense, from a base of zero rotation. For example, if it is desired to take some power from the vehicle's engine to drive (or to assist in driving) the steering shaft, in that case it would be simpler to engineer the system if the steering shaft were set to rotate only in the one direction.

As mentioned, the transmission/steering apparatus of FIG. 2 is highly suitable for use on a tracked vehicle, or a vehicle that uses two lines of wheels, all the left wheels being chained together, and all the right wheels being chained together. However, even when the vehicle has normal steering, the apparatus of FIG. 2 can still be used. In this case, the means for applying a rotational speed to the steering shaft serves also to apply normal steering movement to the front wheels of the vehicle—and the designer then arranges that the differential speeds of the driven, non-steered, rear wheels are coordinated with the steering angles of the non-driven (or driven), steered, front wheels.

It will be understood that the actual assembly of the apparatus as depicted in FIG. 2 poses some difficulties. The "gears-within-gears" aspect of the design means that the bearings cannot just simply be pressed each into place, since the other components impede the assembly operation.

In particular, it is recognised that, in respect of the bearings 78 that hold the output shafts 24,25 in position, it would be difficult to install a means for preventing the output shafts from moving axially towards each other, if that means had to be installed on the bearings themselves. It is recognised, however, that the provision of a means to hold the bearings 78 from wandering inwards can be avoided; this is done, as shown in FIG. 2, by the provision of a thrust washer 79 between the inner ends of the shafts 24,25. The shafts 24,25, and the bearings 78, are held apart by means of the thrust washer 79. Such a thrust washer is very easily assembled, upon the two halves of transmission housing being brought together.

As mentioned, the various gear-shafts of the apparatus, despite accomplishing so many different functions, are all parallel. It is a simple enough task to assemble all the gears, bearings, and shafts, into the gearbox housing, on a production-line basis. Furthermore, it is recognised that the gearbox housing itself can be structured on a two-halves-that-simply-bolt-together basis. The castings for the halves of the housing can be manufactured with a minimum of cores and expensive mould features. This condition is most advantageous in the case where, as here, the plane along which the two halves of the gear box are bolted together lies at right angles to the (parallel) axes of the various gear-shafts.

Figure 4A:
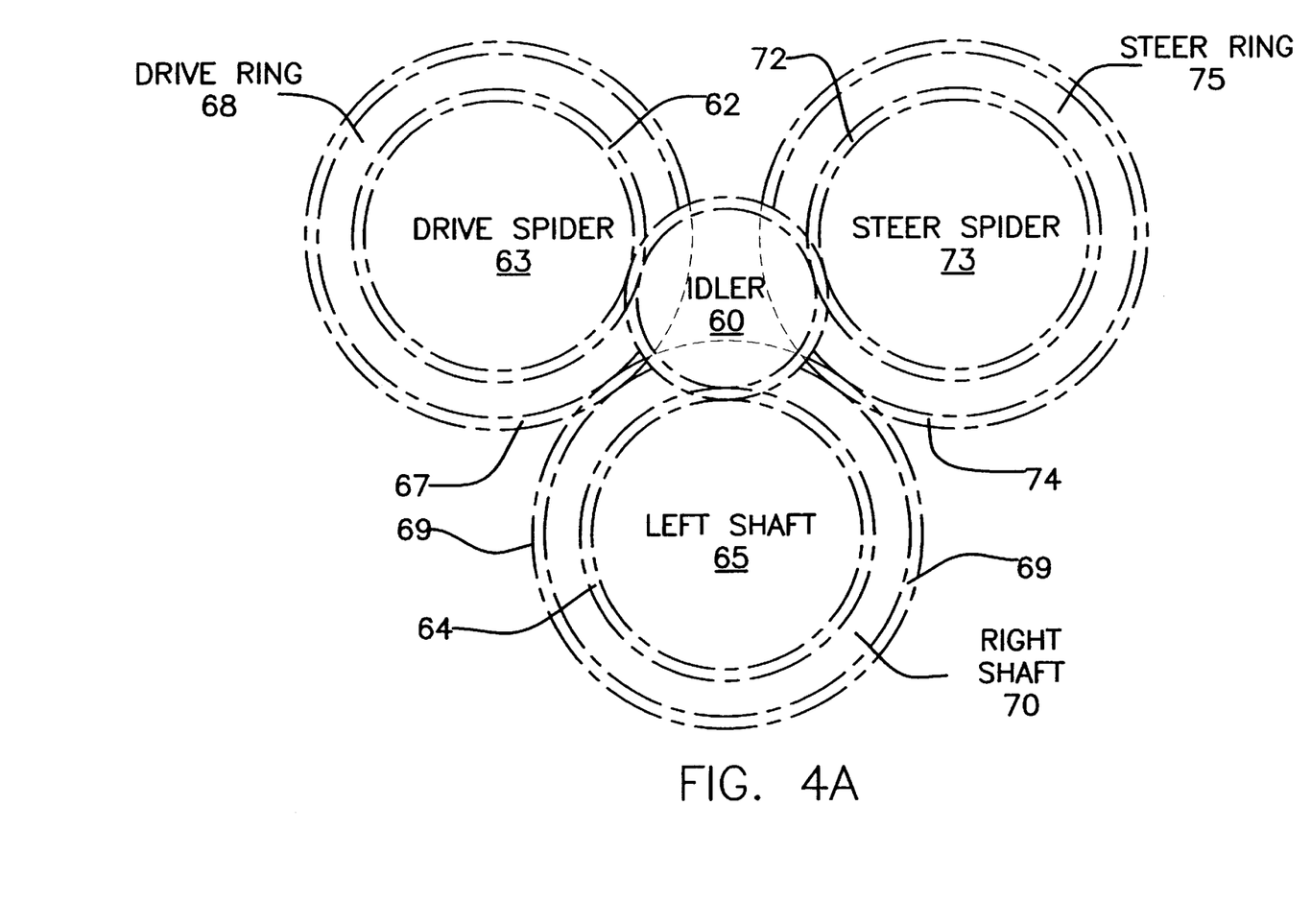
FIG. 4a is a diagrammatic side-elevation of another transmission apparatus that embodies the invention.
Figure 4B:
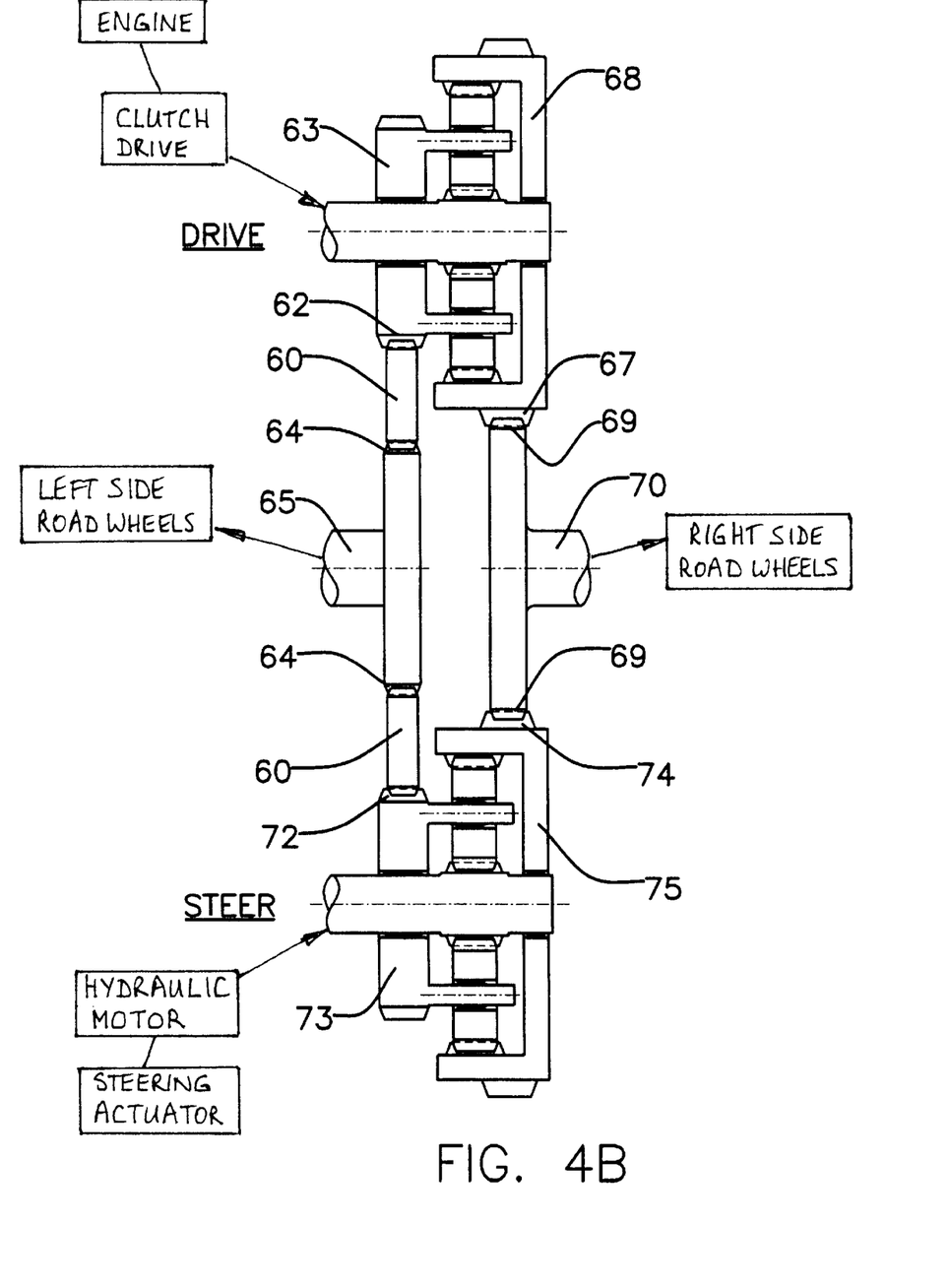

FIG. 4a is a diagrammatic end-view showing another arrangement of gears that embodies the invention. FIG. 4b is a plan view of the arrangement.

Here, the idler-gear is associated not with the outer-rings of the epicyclic sets, but with the planet-carriers or spiders. The idler-gear 60 meshes with teeth 62 on the drive-spider 63 and teeth 64 on the left-output-shaft 65. Teeth 67 on the drive-ring 68 mesh directly with teeth 69 on the right-output-shaft 70.

As before, if the ring-to-sun ratio is 3:1, the correct speeds and torques are realised at the output shafts if the spider-to-left-shaft ratio is 2:3 and the ring-to-right-shaft ratio is 1:2. Generalising, given that the ring-to-sun ratio is N:1, and given that the spider-to-left-shaft ratio is 1:R, the speeds and torques are equalised at the output shafts if the ring-to-right-shaft ratio is 1:R*(N+1)/N. This applies whether the idler is between the spider and the left shaft as in FIGS. 4a,4b, or between the ring and the right shaft as in FIG. 2.

Similarly, the same idler-gear 60 meshes with teeth 72 on the steer-spider 73, and teeth 74 on the steer-ring 75 mesh directly with teeth 69 on the right-output-shaft 70.

In the diagrammatic view of FIG. 4b, the idler-gear 60 is shown as two separate gears, but FIG. 4a shows they are one and the same.

When the epicyclic drive-set and the epicyclic steer-set are identical, and are connected to the left and right output shafts identically, as in the examples depicted herein, the vehicle steering is set to straight ahead when the steering-input-shaft is stationary. Furthermore, a clockwise rotational velocity has the same effect in steering the vehicle to the left as the same magnitude of anti-clockwise rotational velocity has in steering the vehicle to the right. If the steering-set and drive-set were not identical, or were connected to the output shafts unequally, the leftwards steering effect produced by a given change in the clockwise rotational velocity might not be the same as the rightwards steering effect produced by the same magnitude of change in the anti-clockwise velocity (and/or the straight ahead steering position might require some rotational velocity to be constantly applied to the steering-input-shaft, although that can sometimes be an advantage, as mentioned).

In its broadest scope, the invention provides a differential having an inherent gear ratio, typically of the order of 7:1. Such a differential finds application not so much on conventional automobiles and trucks, but on all-terrain vehicles, in which it is a simple matter to arrange that the input shaft from the engine/gearbox into the differential is parallel to the output shafts to the road wheels (so no bevel gears are required).

It is common, in ATVs, for all the left wheels of the vehicle to be geared together, and for all the right wheels to be geared together. The wheels may be tracked, either permanently, or the tracks may be of the kind that can be mounted on and off the wheels optionally/occasionally. Steering is done by driving the right side wheels at a different speed from the left side wheels. ATVs have been proposed which have included left and right sets of driven-wheels, and left and right non-driven-but-steerable wheels, and in some cases steering has been accomplished by a composite system in which the non-driven-but-steerable wheels are steered through an appropriate steering angle, and at the same time the left side set of driven-wheels is driven to rotate at a different speed from the right side set of driven-wheels, the difference being a function of the steering angle.

When the ATV is arranged with a left side set of wheels geared together and a right side set of wheels geared together, the second aspect of the invention comes into its own, i.e of using a corresponding epicyclic set to constrain the ratio between the two sides, and thereby to steer the ATV. This system may be termed a dual-differential drive/steering system, and it may be put to use either in ATVs that have no other steering facility, or in ATVs in which dual-differential drive/steering is used on the rear wheels, or sets of rear wheels, to supplement the steering effect of normally-steered front wheels.

In the case of ATVs with all the left wheels drive-coupled together and all the right wheels drive-coupled together, ATVs with the dual-differential drive/steering system as described herein can be quite considerably better than ATVs with the conventional skid-steering systems (and than ATVs with conventional steering). The fineness and delicacy of control of the steering enables the driver to carry out intricate manoeuvres, to apply power judiciously in low-traction situations, and to escape being bogged down in terrain that would halt a conventional vehicle.

The driven wheels may be drive-coupled together by virtue of the fact that the wheels are tracked. Alternatively, the drive-coupling of the left-side wheels may be done by mounting a sprocket on each left wheel, and running a chain or chains between the sprockets—the right side wheels being correspondingly drive-coupled together.

In describing the embodiments, the terms left and right have been used in the traditional sense, i.e relative to a person driving the vehicle and facing forwards. When assessing the scope of the patent, although the terms should be applied with consistency, they should not be construed as being limited to that traditional sense.

What is claimed is:

1. An all-terrain vehicle comprising a structure and arrangement having left and right co-axial road wheels, wherein:
   the vehicle includes a drive-transmission arrangement;
   the drive-transmission includes:
   a drive-sun-gear;
   a drive-planet-carrier, or drive-spider;
   at least one drive-planet-gear;
   a drive-ring-gear;
   a drive-idler-gear;
   all of which are rotatable, for operation of the vehicle, about respective axes of rotation;
   the drive-spider is mounted co-axially with the drive-sun-gear, and is rotatable relative to the drive-sun-gear;
   the drive-planet-gear is in mesh with the drive-sun-gear;
   the axis of the drive-planet-gear is parallel to, and spaced from, the axis of the drive-sun-gear;
   the axis of rotation of the drive-planet-gear is fixed in the drive-spider;
   the drive-ring-gear is mounted co-axially with the drive-sun-gear, and is rotatable relative to the drive-sun-gear;
   the drive-ring-gear is internal, and is in mesh with the drive-planet-gear;
   the drive-transmission includes a left-output-shaft, and a right-output-shaft;
   the left-output-shaft and the right-output-shaft are adapted to drive the respective road-wheels of the vehicle;
   the structure and arrangement of the vehicle is such that the left road-wheel and the right road-wheel are coaxial, and, in forwards motion of the vehicle, rotate in the same sense;
   the drive-transmission includes a drive-spider-gear-train and a drive-ring-gear-train;
   the drive-spider-gear-train is effective to force the drive-spider and the left-output-shaft to rotate at a drive-spider-train-ratio;
   the drive-ring-gear-train is effective to force the drive-ring-gear and the right-output-shaft to rotate at a drive-ring-train-ratio;

the drive-idler-gear is included in one of the said drive-gear-trains, and is so arranged that the left-output-shaft and the right-output-shaft, and hence the road wheels, rotate in the same sense;

and the vehicle includes an engine, and includes drive structure that is effective to transmit motive power from the engine to the drive-sun-gear.

2. Vehicle of claim 1, wherein the structure and arrangement of the vehicle is such that the ratio of the left road-wheel to the left-output-shaft is fixed, and is such that the ratio of the right road-wheel to the right-output-shaft is fixed.

3. Vehicle of claim 2, wherein the fixed ratio of the left road-wheel to the left-output-shaft is the same as the fixed ratio of the right road wheel to the right-output-shaft.

4. Vehicle of claim 3, wherein the left road wheel is mounted directly on the left-output-shaft and the right road wheel is mounted directly on the right-output-shaft.

5. Vehicle of claim 1, wherein:

the drive-spider-train-ratio and the drive-ring-train-ratio are unequal;

Nsun is the number of teeth on the drive-sun-gear and Nring is the number of teeth on the drive-ring-gear;

the drive-ring-train-ratio and the drive-spider-train-ratio are so geared that the ratio of the drive-ring-train-ratio to the drive-spider-train-ratio is (1+Nsun/Nring) to one.

6. Vehicle of claim 1, wherein:

the vehicle also includes a steer-transmission:

the steer-transmission includes:
  a steer-sun-gear;
  a steer-planet-carrier, or steer-spider;
  at least one steer-planet-gear;
  a steer-ring-gear;
  a steer-idler-gear;

all of the steer-transmission which are rotatable, for operation of the vehicle, about respective axes of rotation;

the steer-spider is mounted co-axially with the steer-sun-gear, and is rotatable relative to the steer-sun-gear;

the steer-planet-gear is in mesh with the steer-sun-gear;

the axis of the steer-planet-gear is parallel to, and spaced from, the axis of the steer-sun-gear;

the axis of rotation of the steer-planet-gear is fixed in the steer-spider;

the steer-ring-gear is mounted co-axially with the steer-sun-gear, and is rotatable relative to the steer-sun-gear;

the steer-ring-gear is internal, and is in mesh with the steer-planet-gear;

the steer-transmission includes a steer-spider-gear-train and a steer-ring-gear-train;

the steer-spider-gear-train is effective to force the steer-spider and one of the left- and right-output-shafts to rotate at a steer-spider-train-ratio;

the steer-ring-gear-train is effective to force the steer-ring-gear and the other of the left- and right-output-shafts to rotate at a steer-ring-train-ratio;

the arrangement of the drive-transmission and the steer-transmission is such that the difference between the rotational speed of the left-output-shaft from the rotational speed of the right-output-shaft is determined by the speed of rotation of the steer-sun-gear;

and the steer-transmission includes an operable steering-means, which is effective, when operated, to drive the steer-sun-gear to rotate at a rotational speed proportional to the steering needs of the vehicle.

7. Vehicle of claim 6, wherein the steer-transmission is in substance identical to the drive-transmission.

8. Vehicle of claim 7, wherein the arrangement of the vehicle is such that, when the steering-means is operated to steer the vehicle in the straight-ahead direction, the speed of rotation of the speed-sun-gear is zero.

9. Vehicle of claim 6, wherein:

the steer-spider-gear-train connects the steer-spider to the left-output-shaft;

the steer-ring-gear-train connects the steer-ring to the right-output-shaft;

the drive-spider-gear-train connects the drive-spider to the left-output-shaft;

the drive-ring-gear-train connects the drive-ring to the right-output-shaft.

10. Vehicle of claim 9, wherein:

the steer-spider-gear-train includes gear teeth on the steer-spider which are in direct mesh with gear teeth on the left-output-shaft;

and the drive-spider-gear-train includes gear teeth on the drive-spider which are in direct mesh with the said gear teeth on the left-output-shaft.

11. Vehicle of claim 10, wherein:

the steer-ring-gear-train includes gear teeth on the steer-ring which are geared to gear teeth on the right-output-shaft;

the drive-ring-gear-train includes gear teeth on the drive-ring which are geared to the said gear teeth on the right-output-shaft.

12. Vehicle of claim 6, wherein:

the drive-idler-gear is included in the drive-spider-gear-rain;

the steer-idler-gear is included in the steer-spider-gear-train;

the drive-spider-gear-train and the steer-spider-gear-train are so arranged that the drive-idler-gear and the steer-idler-gear are one and the same gear.

13. Vehicle of claim 6, wherein:

the drive-idler-gear is included in the drive-ring-gear-train;

the steer-idler-gear is included in the steer-ring-gear-train;

the drive-ring-gear-train and the steer-ring-gear-train are so arranged that the drive-idler-gear and the steer-idler-gear are one and the same gear.

14. Vehicle of claim 6, wherein:

the drive-ring-gear-train includes the drive-idler-gear;

the steer-ring-gear-train includes the steer-idler-gear;

the drive-idler-gear and the steer-idler-gear are formed as one and the same idler-gear-component;

the drive-ring-gear is in direct mesh with gear teeth on the said idler-gear-component;

the steer-ring-gear is in direct mesh with gear teeth on the said idler-gear-component;

and the idler-gear-component is in direct mesh with the gear-teeth on the right-output-shaft.

15. Vehicle of claim 14, wherein the axes of rotation of the steer-sun-gear, the steer-spider, the steer-planet-gear, the steer-ring-gear, the drive-sun-gear, the drive-spider, the drive-planet-gear, the drive-ring-gear, the idler-gear-component, and the left- and right-output-shafts, are all parallel.

16. Vehicle of claim 15, wherein:

the components recited in claim 15 of the drive-transmission and the steer-transmission are housed in a common transmission housing;

the transmission housing is in two halves, which are bolted together;

respective abutment faces on the two halves are thereby brought into contact;

the split plane defined by the abutment faces is perpendicular to the said axes.

17. Vehicle of claim 6, wherein:

NSS is the number of teeth on the steer-sun-gear and NSR is the number of teeth on the steer-ring-gear;

the steer-ring-train-ratio and the steer-spider-train-ratio are so geared that the ratio of the steer-ring-train-ratio to the steer-spider-train-ratio is (1+NSS/NSR) to one.

18. Vehicle of claim 6, wherein the drive-ring-train-ratio, the drive-spider-train-ratio, the steer-ring-train-ratio, and the steer-spider-train-ratio remain constant during operation of the drive-transmission and the steer-transmission.

19. Vehicle of claim 6, wherein the ratio of the drive-ring-train-ratio to the steer-ring-train-ratio is the same as the ratio of the drive-spider-train-ratio to the steer-spider-train-ratio.

20. Vehicle of claim 19, wherein the drive-ring-train-ratio is equal to the steer-ring-train-ratio.

21. Vehicle of claim 6, wherein:

the vehicle includes two or more left-side wheels which are drive-coupled together to rotate in unison with the left-output-shaft;

the vehicle includes two or more right-side wheels, which are drive-coupled together to rotate in unison with the right-output-shaft.

22. Vehicle of claim 6, wherein:

the operable steering means includes a steering-actuator, which is manually operable from a straight-ahead position progressively to a steer-to-the-left position, and progressively to a steer-to-the-right position;

the operable steering means includes a means for driving the steer-sun-gear to rotate clockwise when the steering actuator is moved to a steer-to-the-left position, and to rotate anti-clockwise when the steering actuator is moved to a steer-to-the-right position.

23. Vehicle of claim 22, wherein the steering means includes a hydraulic motor coupled to the steer-sun-gear, and the steering-actuator includes a means for supplying hydraulic fluid to the motor at a flow rate that varies progressively in proportion to the progressive operation of the steering-actuator.

* * * * *